(12) United States Patent
De La Bourdonnaye et al.

(10) Patent No.: US 11,500,848 B2
(45) Date of Patent: Nov. 15, 2022

(54) METHOD FOR DETERMINING THE INTEGRITY OF NAVIGATION DATA OF A CONTROL UNIT OF AN AUTOMOTIVE VEHICLE

(71) Applicants: Continental Automotive France, Toulouse (FR); Continental Automotive GmbH, Hannover (DE)

(72) Inventors: François De La Bourdonnaye, Blagnac (FR); Stéphane Eloy, Tournefeuille (FR); Nora-Marie Gouzenes, Eaunes (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 430 days.

(21) Appl. No.: 16/631,941

(22) PCT Filed: Jul. 17, 2018

(86) PCT No.: PCT/FR2018/051809
§ 371 (c)(1),
(2) Date: Jan. 17, 2020

(87) PCT Pub. No.: WO2019/016464
PCT Pub. Date: Jan. 24, 2019

(65) Prior Publication Data
US 2020/0364206 A1 Nov. 19, 2020

(30) Foreign Application Priority Data
Jul. 20, 2017 (FR) ........................... 1756868

(51) Int. Cl.
*G06F 16/00* (2019.01)
*G06F 16/23* (2019.01)
*G06F 11/10* (2006.01)

(52) U.S. Cl.
CPC ...... *G06F 16/2365* (2019.01); *G06F 11/1004* (2013.01)

(58) Field of Classification Search
None
See application file for complete search history.

(56) References Cited

U.S. PATENT DOCUMENTS

| 6,169,944 B1 * | 1/2001 | Hayasaka | ........... G06F 11/1441 |
| | | | 714/E11.138 |
| 2003/0163245 A1 * | 8/2003 | Aue | ........................ B60T 8/885 |
| | | | 714/E11.003 |

(Continued)

FOREIGN PATENT DOCUMENTS

| DE | 102006039942 A1 | 10/2007 |
| EP | 0896276 A1 | 2/1999 |

OTHER PUBLICATIONS

C. Schmutzler, A. Lakhtel, M. Simons and J. Becker, "Increasing energy efficiency of automotive E/E-architectures with Intelligent Communication Controllers for FlexRay,"2011 International Symposium on System on Chip (SoC), 2011, pp. 92-95, doi: 10.1109/ISSOC.2011.6089228. (Year: 2011).*

(Continued)

*Primary Examiner* — Daniel F. McMahon
(74) *Attorney, Agent, or Firm* — RatnerPrestia

(57) ABSTRACT

A method for determining the integrity of navigation data of a control unit of an automotive vehicle, including the steps involving setting two counters to a value strictly above the maximum of the two counters, and, in a waking phase, calculating the fingerprints of the data written to the reset (Continued)

safe area, comparing the counters and determining the integrity of the data when the counters are the same.

11 Claims, 1 Drawing Sheet

(56) References Cited

U.S. PATENT DOCUMENTS

| | | | |
|---|---|---|---|
| 2008/0034150 A1* | 2/2008 | Mitsuishi | G06F 21/78 |
| | | | 711/102 |
| 2011/0283056 A1 | 11/2011 | Yamamoto | |
| 2012/0144140 A1* | 6/2012 | Rossa | G06F 12/1425 |
| | | | 711/E12.091 |
| 2014/0053030 A1 | 2/2014 | Lee et al. | |
| 2017/0337008 A1* | 11/2017 | Mochizuki | G06F 12/1441 |
| 2020/0364206 A1* | 11/2020 | De La Bourdonnaye | |
| | | | G06F 11/1004 |
| 2021/0089632 A1* | 3/2021 | Ozawa | G06F 9/542 |

OTHER PUBLICATIONS

N. Navet, Y. Song, F. Simonot-Lion and C. Wilwert, "Trends in Automotive Communication Systems," in Proceedings of the IEEE, vol. 93, No. 6, pp. 1204-1223, Jun. 2005, doi: 10.1109/JPROC. 2005.849725. (Year: 2005).*

International Search Report and Written Opinion for International Application No. PCT/FR2018/051809, dated Oct. 31, 2018, 11 pages.

* cited by examiner

US 11,500,848 B2

METHOD FOR DETERMINING THE INTEGRITY OF NAVIGATION DATA OF A CONTROL UNIT OF AN AUTOMOTIVE VEHICLE

CROSS REFERENCE TO RELATED APPLICATIONS

This application is the U.S. National Phase Application of PCT International Application No. PCT/FR2018/051809, filed Jul. 17, 2018, which claims priority to French Patent Application No. 1756868, filed Jul. 20, 2017, the contents of such applications being incorporated by reference herein.

FIELD OF THE INVENTION

The invention is relevant to the field of data backup and relates more particularly to a method for determining the integrity of navigation data and for restoring the data backed up in an electronic control unit of an automotive vehicle.

BACKGROUND OF THE INVENTION

In a control unit (typically an ECU, the acronym for Engine Control Unit), navigation data are backed up in a read-only, or nonvolatile, memory, which is connected to a microcontroller, when power is cut by means of the key for the purpose of stopping the vehicle. When the computer is subsequently started, said data are restored from the nonvolatile memory, so as to be reused by the control unit.

Cutting power by means of the key allows a shutdown phase of the computer to be initiated. Backup of the data from the random access memory, which is also connected to the microcontroller toward the read-only memory, is performed during the shutdown phase of the control unit. At the end of the shutdown phase, the control unit can be deactivated.

A restart or waking can be required during the shutdown phase. The processes ongoing during the shutdown phase then need to be interrupted so as to initiate a waking phase for the control unit as quickly as possible.

The time needed for backing up the data in the read-only memory is not compatible with the reactivity required by waking during a shutdown phase, for example. This time is typically 300 ms, and generally between 100 ms and 3 s.

The writing or copying of one or more items of navigation data, which are created or modified over the course of the trip (for example the signaling of a failure in a sensor), to the read-only memory is interrupted by restarting, before the data have been copied to the read-only memory in the shutdown phase.

To that end, it is known practice to write the data to a portion of random access memory, referred to as a reset safe area, at the start of the shutdown phase. This portion of the random access memory, unlike the other portions of the random access memory, is not reset when the control unit restarts: the data written to the reset safe area remain unchanged on a restart so long as the random access memory is powered up. The fingerprints associated with each of the navigation data items or with each of the groups of navigation data are also calculated, and then stored in the reset safe area.

It is thus possible to determine, in a waking phase, from which memory (random access or read-only) the microcontroller needs to load the data in order to have access to the most recent data and/or sound data. In a waking phase, the microcontroller calculates the fingerprint of each navigation datum or group of navigation data written to the reset safe area and compares it with the fingerprint recorded in the reset safe area beforehand. If they are the same, the random access memory was not powered down between starting and earlier operation. Starting therefore took place during a shutdown phase and the integrity of the data of the read-only memory is not certain. The data are then loaded from the reset safe area. If the associated fingerprints are not the same, the random access memory was powered down, indicating that the shutdown phase was completed. The data are then loaded from the read-only memory.

Waking of the computer can be triggered during a shutdown phase, but after a phase of complete recording of the data in the read-only memory. The method described above does not allow a distinction to be drawn between whether or not the data were actually recorded in the read-only memory in this case.

It is also possible to restart the vehicle at a rate allowing an ill-intentioned user to prevent the data from being written to the read-only memory. On a subsequent restart, if the control unit is no longer supplied with power, the data that have not been backed up in read-only memory are permanently lost.

SUMMARY OF THE INVENTION

It is an aim of the invention to determine the integrity of the navigation data of a control unit, particularly of the data copied to the read-only memory of a control unit, in a simple and precise manner.

This aim is achieved within the context of an aspect of the present invention by virtue of a method for determining the integrity of navigation data of a control unit of an automotive vehicle, the control unit comprising a microcontroller, a random access memory and a read-only memory, which are connected to the microcontroller, the random access memory being configured so that a reset safe area of the random access memory is not reset when the control unit starts, the method being characterized in that it comprises the steps involving:

a) during a trip, calculating the maximum of a first counter and of a second counter, the second counter not being associated with any fingerprint, and setting said counters to a value strictly above the maximum;

b) in a shutdown phase of the control unit, initiating copying of the navigation data of the first counter and of the second counter to the reset safe area, initiating calculation and copying of a fingerprint of each navigation datum and of a fingerprint of the first counter to the reset safe area, then initiating copying of the navigation data and of the counters to the read-only memory by starting by copying the first counter and by copying each datum before the second counter;

c) in a waking phase, loading the second counter from the read-only memory;

d) in a waking phase, calculating the fingerprints of the data and of the first counter that have been copied to the reset safe area;

e) in a waking phase, loading the first counter from the reset safe area when the calculated fingerprint and the recorded fingerprint of the first counter in the reset safe area are the same, and loading the first counter from the read-only memory when the calculated fingerprint is different than the recorded fingerprint of the first counter in the reset safe area;

f) in a waking phase, comparing the first counter and the second counter;

g) determining the integrity of the navigation data of the read-only memory when the first counter is the same as the second counter in step f).

Advantageously, in step g), a user of the vehicle is notified of the integrity of the navigation data when the counters are the same and of the corruption of the navigation data when the counters are different.

Advantageously, the method comprises a step of restoring the navigation data:
  from the read-only memory when the first counter and the second counter are the same, and
  from the random access memory when the first counter and the second counter are different.

Advantageously, a fingerprint is calculated by means of a method chosen from at least one cyclic redundancy check and a checksum.

Another aspect of the invention is a control unit of an automotive vehicle comprising a microcontroller, a random access memory and a read-only memory, which are connected to the microcontroller, the random access memory being configured so that a reset safe area of the random access memory is not reset when the control unit starts, the control unit being configured so as:
a) to calculate the maximum of a first counter and of a second counter, the second counter not being associated with any fingerprint, and to set said counters to a value strictly above the maximum;
b) in a shutdown phase of the control unit, to initiate copying of the navigation data of the first counter and of the second counter to the reset safe area, to initiate calculation and copying of a fingerprint of each navigation datum and of a fingerprint of the first counter to the reset safe area, then to initiate copying of the navigation data and of the counters to the read-only memory by starting by copying the first counter and by copying each datum before the second counter;
c) in a waking phase, to load the second counter from the read-only memory;
d) in a waking phase, to calculate the fingerprints of the data and of the first counter that have been copied to the reset safe area;
e) in a waking phase, to load the first counter from the reset safe area when the calculated fingerprint and the recorded fingerprint of the first counter in the reset safe area are the same, and to load the first counter from the read-only memory when the calculated fingerprint is different than the recorded fingerprint of the first counter in the reset safe area;
f) in a waking phase, to compare the first counter and the second counter;
g) to determine the integrity of the navigation data of the read-only memory when the first counter is the same as the second counter in step f).

Advantageously, the control unit is configured to notify a user of the vehicle of the integrity of the navigation data when the counters are the same and of the corruption of the navigation data when the counters are different.

Advantageously, the control unit is configured to restore navigation data:
  from the read-only memory when the first counter and the second counter are the same, or
  from the random access memory when the first counter and the second counter are different.

BRIEF DESCRIPTION OF THE DRAWINGS

Other features and advantages will become clear from the description that follows, which is purely illustrative and nonlimiting, and which must be read with reference to the appended figures, in which.

DETAILED DESCRIPTION OF THE PREFERRED EMBODIMENTS

Figure 1:
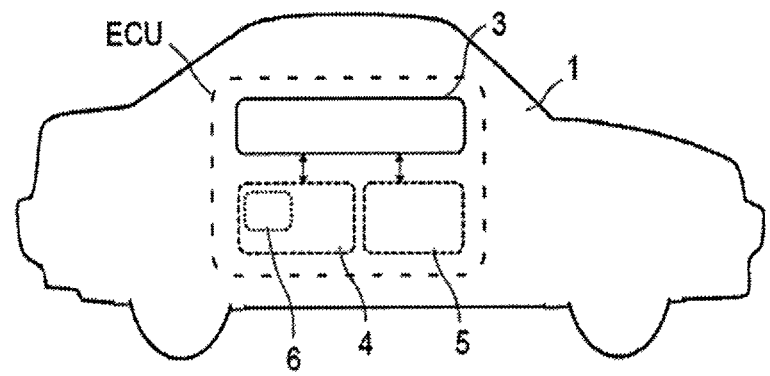
FIG. 1 schematically describes an automotive vehicle 1 comprising a control unit.

FIG. 1 schematically describes an automotive vehicle 1 comprising a control unit ECU. The control unit ECU of the vehicle 1 comprises a microcontroller 3 or microprocessor, illustrated by a black rectangle in solid lines, electrically connected to a read-only memory 5, or nonvolatile memory, illustrated by a rectangle in dotted lines, and also electrically connected to a random access memory 4, or volatile memory, illustrated by a rectangle in dotted lines.

The read-only memory 5 may be a memory of FLASH type, or more generally of EEPROM (acronym for Electrically-Erasable Programmable Read-Only Memory) type.

The random access memory 4 is also referred to as a volatile memory, or RAM. The random access memory 4 comprises a reset safe area 6. This portion of the random access memory 4 is not reset when the control unit ECU restarts: the data copied to the reset safe area 6 remain unchanged on a restart so long as the random access memory 4 is powered up.

Figure 2:
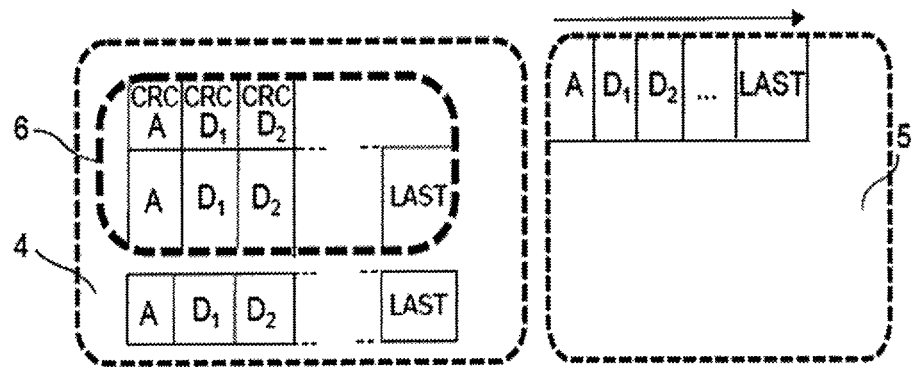
FIG. 2 schematically describes various memories and memory areas of the control unit.

FIG. 2 schematically describes various memories and memory areas of the control unit ECU.

The random access memory 4 is illustrated by a dotted rectangle on the left of FIG. 2. This memory comprises a reset safe area 6.

Generally, the control unit ECU is configured to process and/or store a first set of data. This set of data comprises sets of variables, or channels, including at least a first counter A, a second counter LAST and a set of navigation data D (comprising the navigation data $D_i$, i being a natural integer, which are illustrated by the data $D_1$ and $D_2$ in FIG. 2). Channel refers to a group of data or sets of variables linked to one and the same function, for example relating to the engine of the vehicle 1. These navigation data correspond for example to a distance covered, to a consumption, but can also correspond to the signaling of a failure in the vehicle 1 or of the fault in a sensor.

A fingerprint is understood to mean a datum allowing identification of another datum, such as a checksum, a digital fingerprint, a hash, a digest, a condensate, a signature or else a cryptographic fingerprint. Reading a fingerprint allows the integrity of a datum to be checked. Advantageously, a fingerprint can be obtained by means of a hash function and/or a cyclic redundancy check (CRC). The size of the CRC typically used is 8 bits, 16 bits or 32 bits.

A CRC fingerprint can be calculated for a first counter A and for each datum $D_i$. The second counter LAST is configured so as not to have a calculable fingerprint, in particular a fingerprint of CRC type. In other words, it is impossible to calculate the fingerprint of the second counter LAST.

The random access memory 4 is configured to store the set of data in an area other than the reset safe area.

The reset safe area 6 is configured to store the first counter A, the second counter LAST and the navigation data of the vehicle 1. These data are duplicated, in the example illustrated in FIG. 2, in another area of the random access memory 4.

The read-only memory 5 is configured to store at least the set of data (comprising the first counter A, the second counter LAST and the navigation data $D_i$). The read-only memory 5 is also configured to allow the microcontroller 3 to write the set of data in a defined order: by starting by copying the first counter A, then by writing each datum $D_i$ before copying the second counter LAST. This copy order for the set of data is illustrated by the arrow above the read-only memory 5.

The microcontroller 3 is configured to calculate the CRC fingerprint of each datum copied to the random access memory 4, insofar as these fingerprints are calculable, which is not the case for the fingerprint of the second counter LAST. The microcontroller 3 can calculate the CRC fingerprint A of the first counter and the CRC fingerprints $D_i$ of each navigation datum (for example CRC $D_1$, CRC $D_2$, etc.). The microcontroller 3 is also configured to write each of these data and each of the associated calculated fingerprints to the reset safe area 6 of the random access memory 4.

Figure 3:
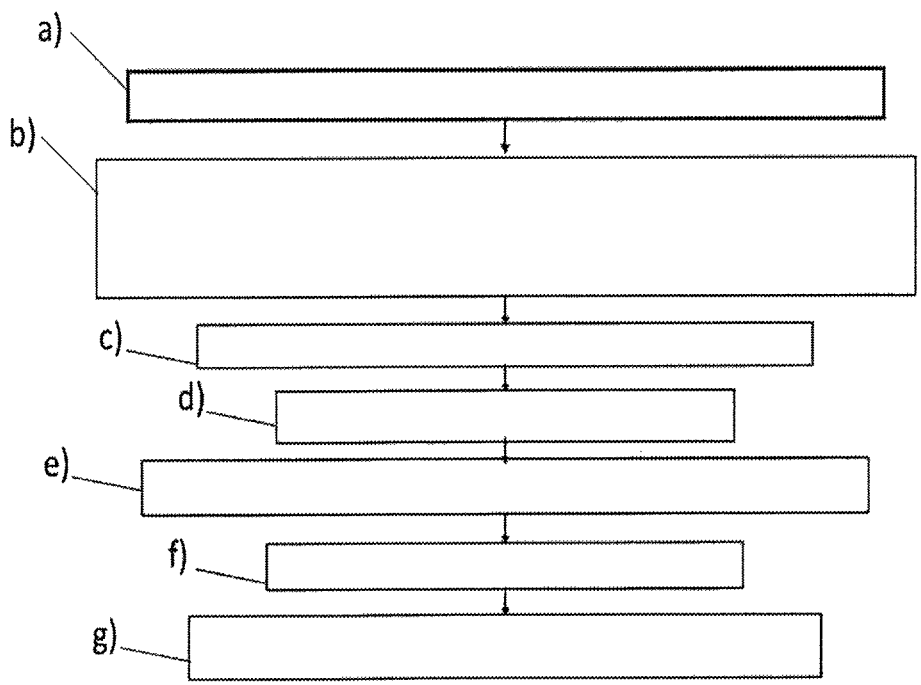
FIG. 3 schematically illustrates a method for restoring navigation data according to an embodiment of the invention.

FIG. 3 illustrates a method for restoring navigation data according to an embodiment of the invention.

In a step a), the maximum of the first counter A and of the second counter LAST are calculated, and then the value of the counters A and LAST are set to a value strictly above this maximum. Advantageously, the value of the first counter A and of the second counter LAST are set to the value of this maximum plus one. This step can be implemented while the vehicle 1 is moving and more generally at any moment before the shutdown phase of the control unit ECU.

In step b), during a shutdown phase of the control unit ECU, writing, in other words copying, of the navigation data of the first counter A and of the second counter LAST to the reset safe area 6 of the random access memory 4 is initiated and calculation and copying of the CRC fingerprint of each navigation datum and of the counter A to the reset safe area 6 are initiated. The second counter LAST has no calculable fingerprint: its fingerprint cannot be copied to the reset safe area 6. Finally, copying of the data to the read-only memory 5 is initiated in the order illustrated in FIG. 2, that is to say by starting by copying the first counter A, then by writing each datum before writing the second counter LAST.

If the control unit ECU is powered down after the shutdown phase, all of the data of the random access memory 4 are in an indeterminate state when the random access memory 4 is powered up again. As the data of the reset safe area 6 are not reset, they are also in an indeterminate state after the random access memory 4 is initialized.

Waking can be requested during the shutdown phase, and more particularly during step b). If copying of the navigation data and of the counters to read-only memory 5 has been initiated, it needs to be interrupted at the time of waking in order to satisfy a reactivity criterion for the waking of the vehicle 1.

A user of the vehicle 1 can order a waking phase during a shutdown phase. In step c), in a waking phase, the second counter LAST is loaded from the read-only memory 5.

In a step d), the fingerprints of the navigation data and of the first counter A that have been copied to the reset safe area 6 are calculated in the waking phase. Each copied (or recorded) fingerprint associated with a datum in the reset safe area 6 is then compared with the fingerprint calculated in step d) that is associated with the same datum.

In a step e) in the waking phase, when the calculated fingerprint and the recorded fingerprint of the first counter A in the reset safe area 6 are the same, the first counter A is copied from the reset safe area 6 to another area of the random access memory 4. On the other hand, when the calculated fingerprint of the first counter A and the fingerprint of the first counter A that is recorded in the reset safe area 6 are different, the first counter A is copied from the read-only memory 5 to the random access memory 4 in a different area of the reset safe area 6.

In a step f), the first counter A copied in step e) and the second counter LAST copied in step c) are compared. The first counter A and the second counter LAST may be the same or different.

In step g), the integrity of the navigation data, in particular of the navigation data copied to the read-only memory 5, is determined when the first counter A is the same as the second counter LAST. Otherwise, when the first counter A is different than the second counter LAST, the degradation of the data, in particular of the navigation data copied to the read-only memory 5, is determined. "Degraded" refers to data that do not represent the current state of the vehicle 1.

It is advantageously possible to provide notification of the integrity or degradation of the navigation data copied to the read-only memory 5. Such notification can be implemented by copying a datum or a set of variables representative of the integrity of the data to the read-only memory 5. It is also possible to signal the integrity or degradation of the data to a user of the vehicle 1 and/or to the control unit ECU, for example when the vehicle 1 starts.

It is also possible to restore the set of data in the random access memory 4 of the control unit ECU from the read-only memory 5 when the first counter A and the second counter LAST are the same. This scenario corresponds to a situation in which the set of data has been copied entirely in the previous shutdown phase of the control unit ECU.

On the other hand, when the first counter A and the second counter LAST are different, the data are restored from the random access memory 4. In this case, the navigation data have not been able to be copied entirely to the read-only memory 5 in the shutdown phase of the control unit ECU (as all the navigation data are copied before the counter LAST). This method allows determination of whether, in the event of a loss of power to the computer and the random access memory 4 after step g), data restored from the read-only memory 5 to the random access memory 4 are restored with or without a loss of information (that is to say a degradation) relative to the movements of the data during the previous trips.

The invention claimed is:

1. A method for determining the integrity of navigation data of a control unit of an automotive vehicle, the control unit comprising a microcontroller, a random access memory and a read-only memory, which are connected to the microcontroller, the read-only memory being configured so that a reset safe area of the random access memory is not reset when the control unit starts, the method comprising:
   a) calculating maximum of a first counter (A) and of a second counter (LAST), the second counter (LAST) not being associated with any identification fingerprint, and setting said first counter (A) and said second counter (LAST) to a value greater than the maximum;
   b) in a shutdown phase of the control unit, initiating copying of a navigation data of the first counter (A) and of the second counter (LAST) to the reset safe area, initiating calculation and copying of an identification fingerprint of each navigation datum and of an identification fingerprint of the first counter (A) to the reset safe area, then initiating copying of the navigation data and of the first counter (A) and the second counter (LAST) to the read-only memory by copying the first counter (A) to the read-only memory and each datum before copying the second counter (LAST) to the read-only memory;

c) in a waking phase, loading the second counter (LAST) from the read-only memory;

d) in the waking phase, calculating the identification fingerprints of the navigation data and of the first counter (A) that have been copied to the reset safe area;

e) in the waking phase, loading the first counter (A) from the reset safe area when the calculated identification fingerprint matches the copied identification fingerprint of the first counter (A) in the reset safe area, and loading the first counter (A) from the read-only memory when the calculated identification fingerprint is different than the copied identification fingerprint of the first counter (A) in the reset safe area;

f) in the waking phase, comparing the first counter (A) copied in step (e) and the second counter (LAST) loaded in step (c); and g) determining the integrity of the navigation data copied to the read-only memory when the comparison in step (f) indicates that the first counter (A) copied in step (e) is the same as the second counter (LAST) loaded in step (c).

2. The method as claimed in claim 1, wherein, in step g), a user of the automotive vehicle is notified of the integrity of the navigation data when the first counter (A) and the second counter (LAST) are the same as each other or of the degradation of the navigation data when the first counter (A) and the second counter (LAST) are different than each other.

3. The method as claimed in claim 1, furthermore comprising restoring the navigation data:
from the read-only memory when the first counter (A) and the second counter (LAST) are the same as each other, or
from the random access memory when the first counter (A) and the second counter (LAST) are different than each other.

4. The method as claimed in claim 1, wherein the identification fingerprint is calculated by a method chosen from at least one cyclic redundancy check and a checksum.

5. A control unit of an automotive vehicle comprising a microcontroller, a random access memory and a read-only memory, which are connected to the microcontroller, the read-only memory being configured so that a reset safe area of the random access memory is not reset when the control unit starts, the control unit being configured so as:

a) during a trip, to calculate maximum of a first counter (A) and of a second counter (LAST), the second counter (LAST) not being associated with any identification fingerprint, and to set said first counter (A) and the second counter (LAST) to a value greater than the maximum;

b) in a shutdown phase of the control unit, to initiate copying of a navigation data of the first counter (A) and of the second counter (LAST) to the reset safe area, to initiate calculation and copying of an identification fingerprint of each navigation datum and of an identification fingerprint of the first counter (A) to the reset safe area, then to initiate copying of the navigation data and of the first counter (A) and the second counter (LAST) to the read-only memory by copying the first counter (A) to the read-only memory and each datum before copying the second counter (LAST) to the read-only memory;

c) in a waking phase, to load the second counter (LAST) from the read-only memory;

d) in the waking phase, to calculate the identification fingerprints of the navigation data and of the first counter (A) that have been copied to the reset safe area;

e) in the waking phase, to load the first counter (A) from the reset safe area when the calculated identification fingerprint matches the copied identification fingerprint of the first counter (A) in the reset safe area, and to load the first counter (A) from the read-only memory when the calculated identification fingerprint is different than the copied identification fingerprint of the first counter (A) in the reset safe area;

f) in the waking phase, to compare the first counter (A) copied in step (e) and the second counter (LAST) loaded in step (c);

g) to determine the integrity of the navigation data of the read-only memory when the comparison in step (f) indicates that the first counter (A) copied in step (e) is the same as the second counter (LAST) loaded in step (c).

6. The control unit as claimed in claim 5, configured to notify a user of the automotive vehicle of the integrity of the navigation data when the first counter (A) and the second counter (LAST) are the same as each other and of the degradation of the navigation data when the first counter (A) and the second counter (LAST) are different.

7. The control unit as claimed in claim 5, configured to restore navigation data:
from the read-only memory when the first counter (A) and the second counter (LAST) are the same as each other, or
from the random access memory when the first counter (A) and the second counter (LAST) are different than each other.

8. The method as claimed in claim 2, furthermore comprising restoring the navigation data:
from the read-only memory when the first counter (A) and the second counter (LAST) are the same as each other, or
from the random access memory when the first counter (A) and the second counter (LAST) are different than each other.

9. The method as claimed in claim 2, wherein the identification fingerprint is calculated by a method chosen from at least one cyclic redundancy check and a checksum.

10. The method as claimed in claim 3, wherein the identification fingerprint is calculated by a method chosen from at least one cyclic redundancy check and a checksum.

11. The control unit as claimed in claim 6, configured to restore navigation data:
from the read-only memory when the first counter (A) and the second counter (LAST) are the same as each other, or
from the random access memory when the first counter (A) and the second counter (LAST) are different than each other.

* * * * *